Jan. 26, 1943.  H. A. RAPHAEL  2,309,211
ROTATABLE DIAL FOR DETERMINING AMOUNT OF WEIGHT ON FORMATION
Filed July 4, 1939  4 Sheets-Sheet 1

HAROLD A. RAPHAEL,
INVENTOR;

BY Robert M. McManigal
ATTORNEY.

Jan. 26, 1943. H. A. RAPHAEL 2,309,211
ROTATABLE DIAL FOR DETERMINING AMOUNT OF WEIGHT ON FORMATION
Filed July 4, 1939 4 Sheets-Sheet 2

HAROLD A. RAPHAEL,
INVENTOR;

BY
Robert M. McManigal
ATTORNEY.

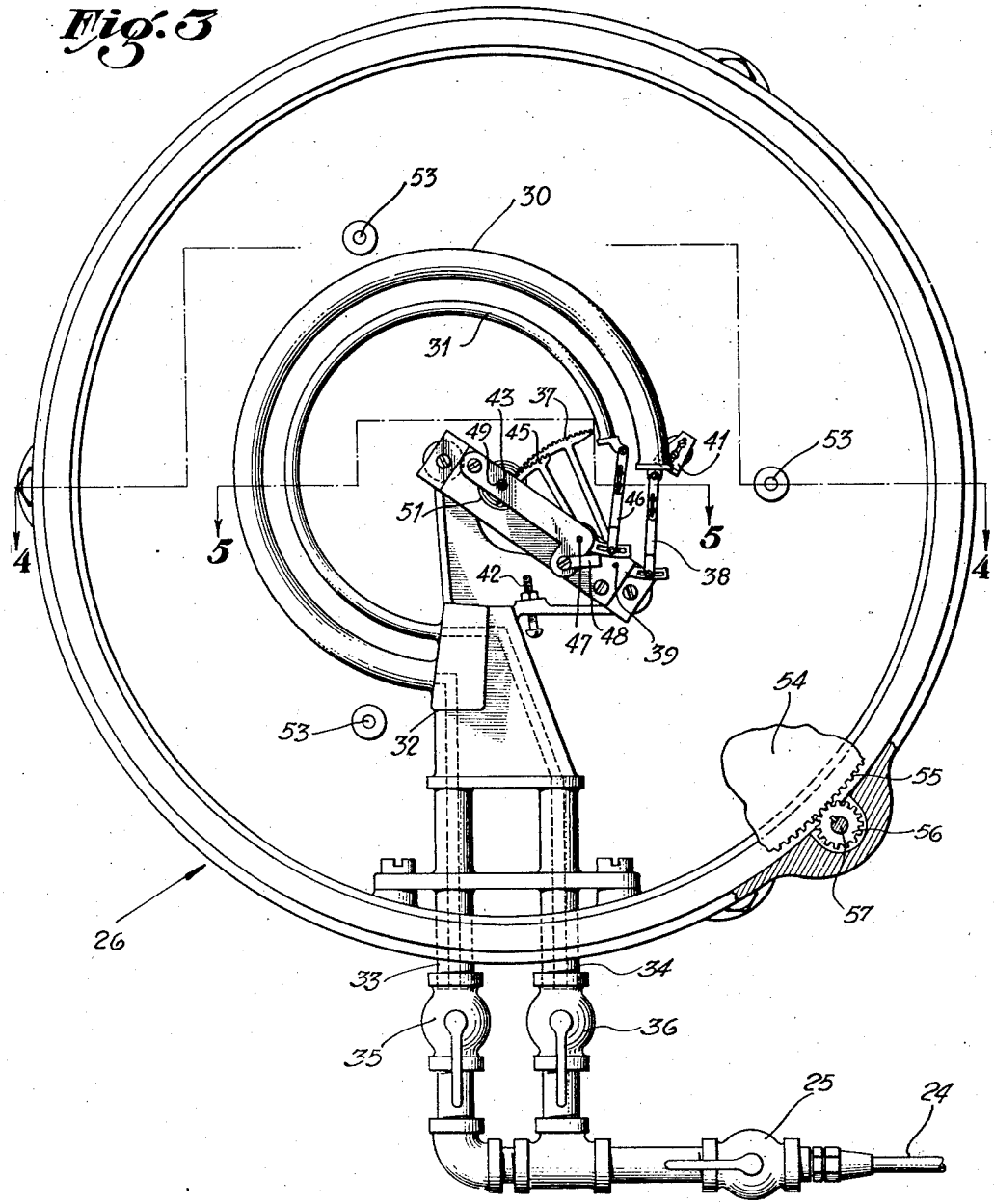

Jan. 26, 1943.  H. A. RAPHAEL  2,309,211
ROTATABLE DIAL FOR DETERMINING AMOUNT OF WEIGHT ON FORMATION
Filed July 4, 1939    4 Sheets-Sheet 4
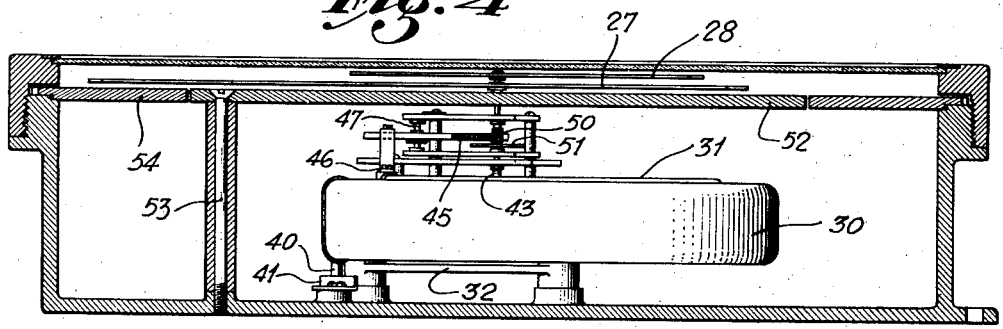
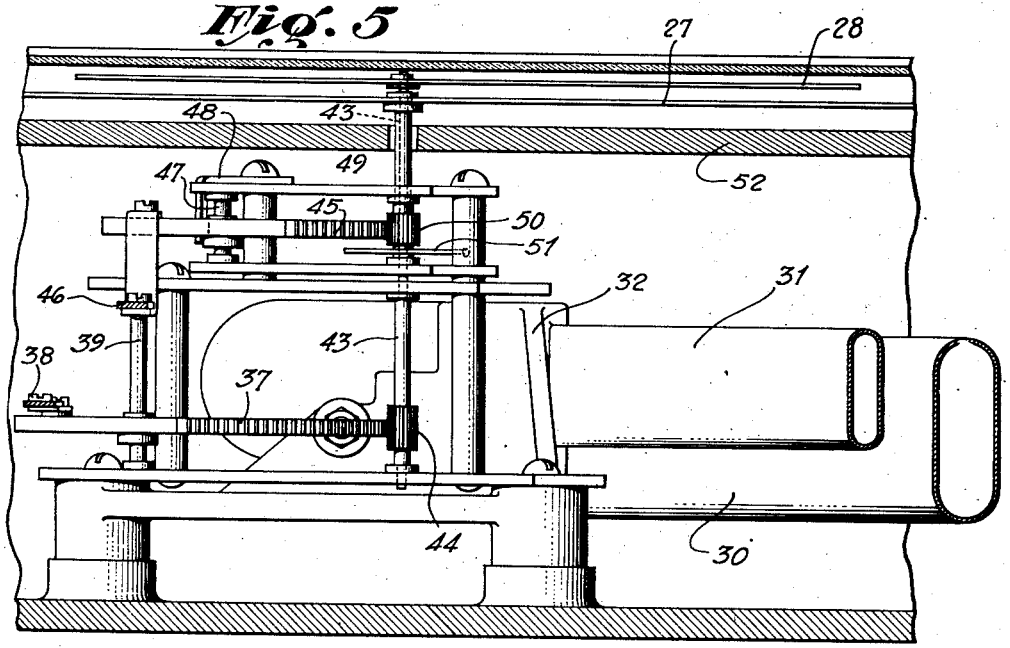
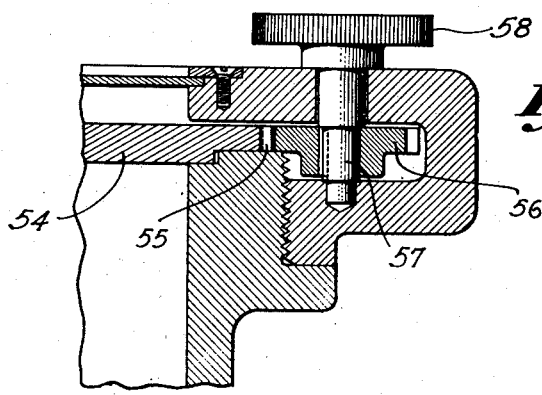
HAROLD A. RAPHAEL,
INVENTOR;
BY Robert M. McManigal
ATTORNEY.

Patented Jan. 26, 1943

2,309,211

UNITED STATES PATENT OFFICE 2,309,211

ROTATABLE DIAL FOR DETERMINING AMOUNT OF WEIGHT ON FORMATION

Harold A. Raphael, Bellflower, Calif., assignor to MacClatchie Manufacturing Company of California, Compton, Calif., a corporation of California Application July 4, 1939, Serial No. 282,757

2 Claims. (Cl. 73—151)

This invention relates to a rotatable dial for determining the amount of weight on the formation in well drilling operations.

The object of my invention is to provide a means for obtaining a direct reading of the amount of the weight on the formation in well drilling operations. No other means that I am aware of enables the operator to obtain this information by a direct reading.

In order to obtain this information with the use of all other weight indicators, it is necessary to consult either charts or graphs after obtaining the reading on the dial.

Another object of my invention is to provide a dial which is rotatable with respect to a stationary dial, and which is adapted to indicate the amount of weight on the formation in well drilling operations.

The diaphragm unit mentioned hereinafter is adapted to be mounted on the "dead-line" so that it will deflect the regular indicating hand of the gauge one point for any predetermined number of pounds suspended from the derrick, multiplied by the number of cable lines between the crown block and the traveling block. In other words, the amount of deflection of the regular indicating hand depends not only upon the amount of weight suspended from the derrick, but also upon the number of cables lines between the crown block and the traveling block. For example, if the diaphragm unit is mounted on the dead-line so that the regular indicating hand will be deflected one point for every 340 pounds multiplied by the number of cable lines between the crown block and the traveling block, the regular indicating hand will be deflected one point for every 2040 pounds suspended from the derrick if there are six cable lines between said blocks, and the regular indicating hand will be deflected one point for every 3400 pounds suspended from the derrick if there are ten cable lines between said blocks.

Another object of my invention is to provide a rotatable dial which is provided with a scale corresponding with the actual number of cable lines between the crown block and the traveling block in order to obtain a direct reading of the amount of weight on the formation.

Another object of my invention is to provide a rotatable dial with a plurality of scales so that a direct reading of the amount of weight on the formation can be obtained in any installation where any of the usual number of cable lines between the crown block and the traveling block are used.

My invention has many other objects, advantages, and features, some of which, with the foregoing, will be set forth at length in the following description where I shall outline one form of my invention, which I have selected for illustration in the drawings accompanying and forming a part of the present specification. It is to be understood that I do not limit myself to the form shown in the drawings since the invention, as expressed in the claims, may be embodied in a large plurality of forms.

Referring to the drawings:

Figure 3 is a plan view of the gauge with the dials removed.

Figure 4 is a vertical view taken on the line 4—4 of Figure 3.

Figure 5 is a vertical section taken on the line 5—5 of Figure 3.

Figure 6 is a vertical section taken on the line 6—6 of Figure 2.

Figure 1:
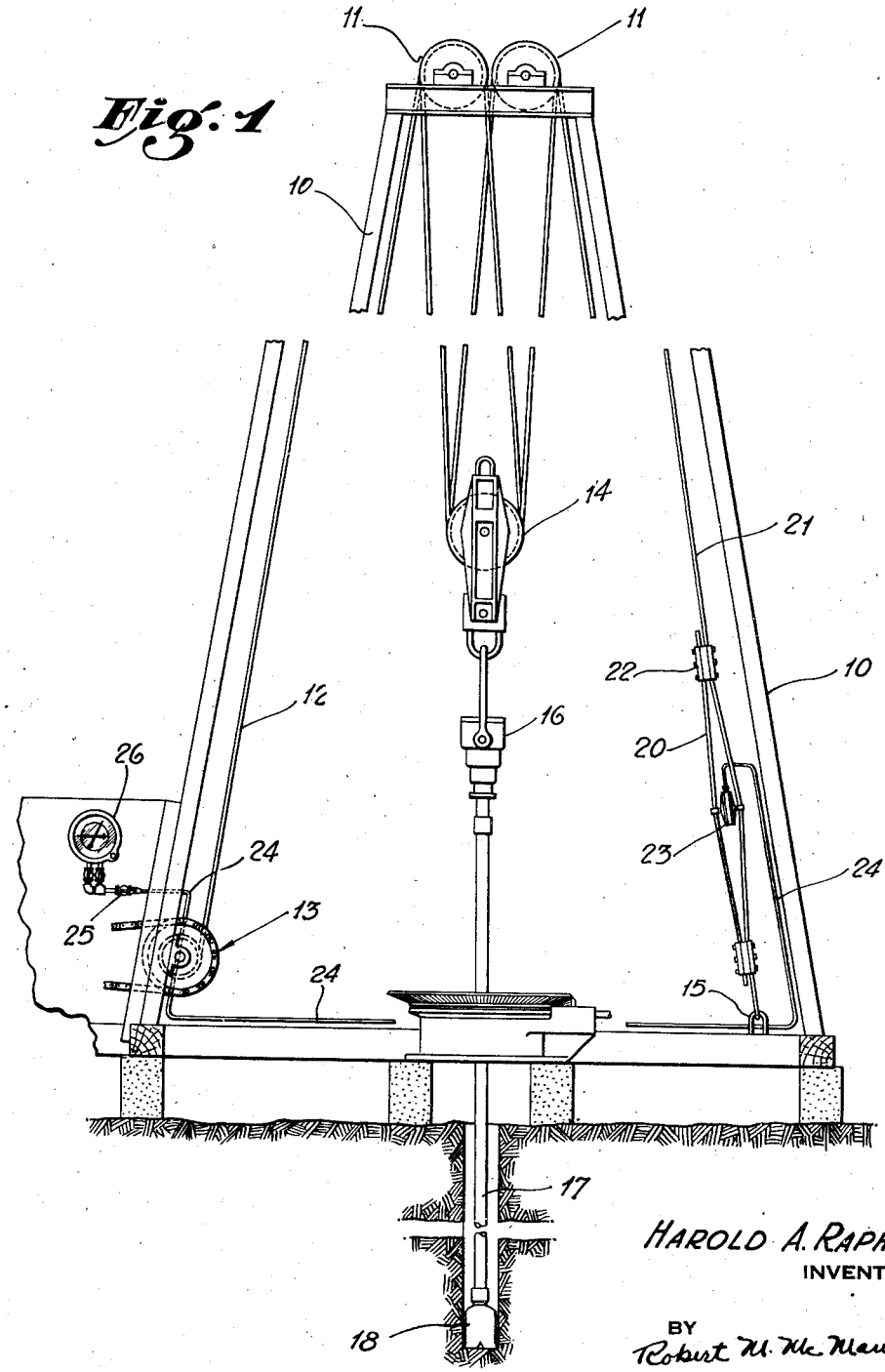
Figure 1 is an elevational view of a rotary well drilling ring embodying one form of the invention.
Figure 2:
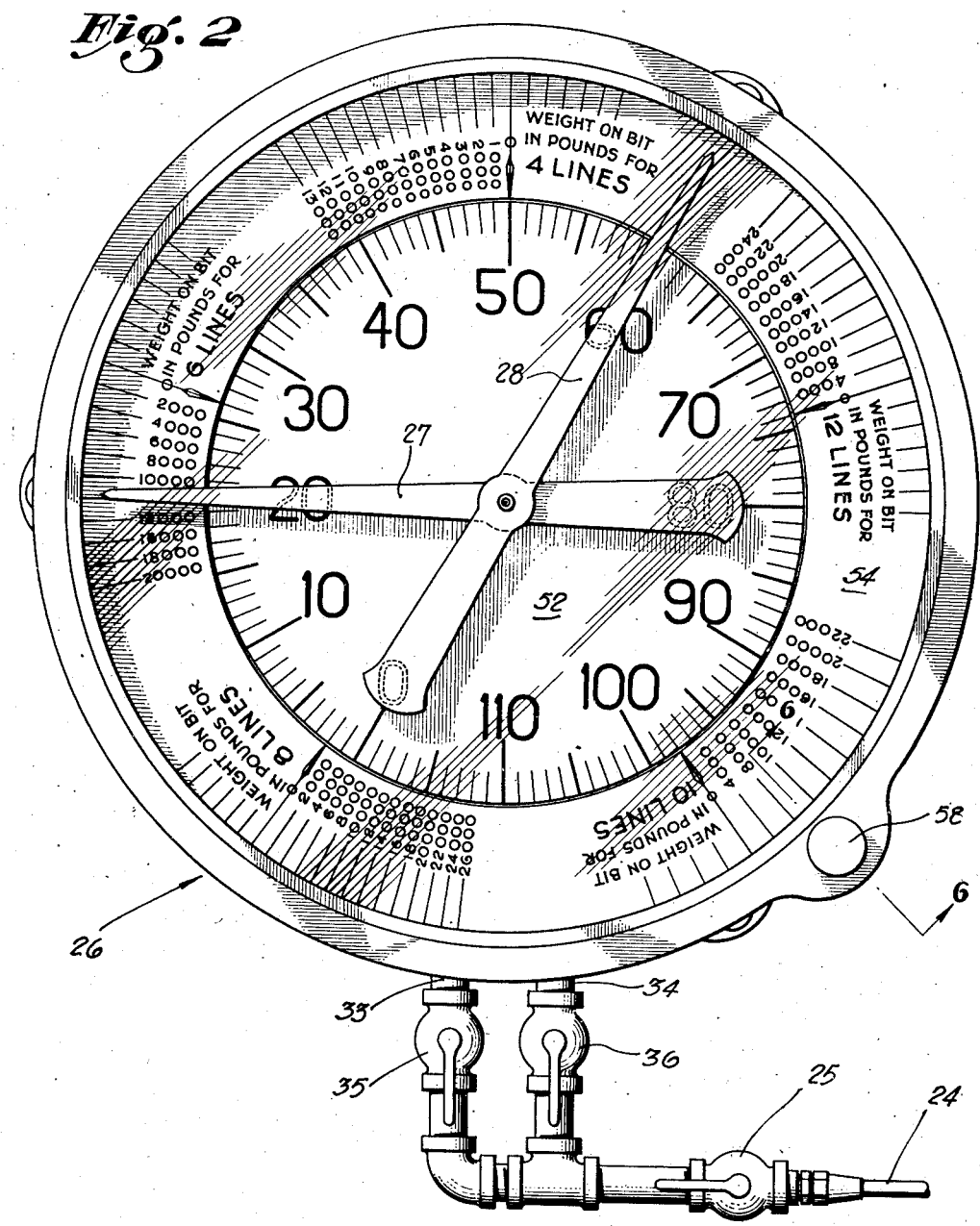
Figure 2 is a face view of the dials of my invention.

This invention is particularly adapted for use on rotary well drilling rigs, and an instance of such an arrangement is shown in Figure 1. Obviously my invention is adapted to be used with a gauge having a single indicating hand, or with a gauge having two or more indicating hands. For illustrative purposes, I have shown by invention as applied to a gauge having both a "regular" and a "more sensitive" hand. In said drawing the numeral 10 indicates a derrick which supports crown blocks 11. One end of a drilling cable 12 is secured to a draw works 13, from which it extends over the crown blocks 11, down around a traveling block 14 and over said crown blocks 11 several times, and the other end of which is secured to the derrick foundation as indicated at 15. A rotary swivel 16 is secured to the traveling block 14 and extending downwardly from said swivel is a drill string 17, at the lower end of which is a drill bit 18.

A section of cable 20 is secured at its opposite ends to the "dead-line" 21 by means of clamps 22 and interposed between said cable 12 and the section of cable 20 is a diaphragm unit 23, preferably of the type shown and described in my co-pending application, Serial No. 168,814, filed October 13, 1937. However, any suitable diaphragm unit may be used which causes the indicating hand to deflect in direct proportion to the load. This diaphragm unit is provided with a fluid chamber which is adapted to be compressed by pistons which are operatively connected to the cable 12 and cable section 20. When pressure is exerted by the load on the cable 12 the portions of the cables 12 and 20 between the clamps 22 will tend to move toward one another against the action of the fluid in the diaphragm chamber. This causes the pistons to move inwardly flexing the diaphragm chamber which in turn forces the fluid to flow through a conduit 24 having a valve 25 to a gauge 26, thereby operating said gauge.

The gauge 26 is provided with both a regular indicating hand 27 and a much more sensitive hand 28, and means for operating said indicating hands. As an instance of this arrangement, the gauge 26 is provided with Bourdon tubes 30 and 31, the inner ends of which are mounted on a support 32. The larger tube 30 is much more sensitive than the smaller tube 31. The Bourdon tubes 30 and 31 are connected to the conduit 24 by means of conduits 33 and 34 respectively, each of said conduits having a valve 35 and 36 respectively.

The free end of the Bourdon tube 30 is connected to a gear sector 37 by means of adjustable linkage 38, said sector being mounted on a rotatable shaft 39. Means are provided to limit the movement of said Bourdon tube 30 and said sector 37. As an instance of this arrangement, the free end of the Bourdon tube 30 is provided with a depending portion 40 which is adapted to engage an adjustable stop 41 in order to limit the travel of said tube, and an adjustable screw 42 is mounted on the support 32 which screw is adapted to engage the adjacent side of said sector in order to limit the travel of said sector.

Also mounted on said support 32 is a rotatable shaft 43 which is provided with a pinion gear 44 near its lower end and the top of said shaft is tapered so that indicating hand 28 can be securely attached thereto. The teeth of the gear sector 37 are adapted to mesh with the teeth of said pinion gear 44 and thereby move the hand 28.

The free end of the Bourdon tube 31 is connected to a gear sector 45 by means of adjustable linkage 46, said gear sector being mounted on a rotatable shaft 47. An adjustable stop 48 is provided in order to limit the inward movement of said sector as shown in Figure 3 when no pressure is exerted on the cables 12 and 13. A sleeve 49 is mounted on the shaft 43 in such a manner that it is rotatable independent of the rotation of said shaft, and said sleeve is provided with a pinion gear 50 the teeth of which are adapted to mesh with the teeth of the sector 45 and thereby move the hand 27. A hair spring 51 is mounted in such a manner to insure that the gear sector 45 is in its proper position with no pressure in the tube 31.

As clearly shown in Figure 4, an inner dial 52 is mounted in the case by means of bolts 53. A rotatable dial 54 is mounted around said dial 52, and means are provided to rotate said dial. As an instance of this arrangement, the periphery of the rotatable dial 54 is provided with gear teeth 55 which are adapted to mesh with gear teeth 56 which are mounted on a rotatable shaft 57 which is adapted to be rotated by means of a knob 58.

As previously stated, as pressure is exerted on the cable 12, the portions of the cables 12 and 20 tend to move toward one another, causing the pistons to move inwardly against the action of the fluid in the diaphragm chamber and forcing fluid to flow through the conduit 24 to the Bourdon tubes 30 and 31. This fluid causes the free end of said tubes to flex away from the shafts 39 and 47 respectively, thereby moving the sectors 37 and 45 respectively. Movement of the sector 37 causes the shaft 43 to rotate and thereby move the indicating hand 28, and movement of the sector 45 causes the sleeve 49 to rotate and thereby move the indicating hand 27. The Bourdon tubes 30 and 31 and the sectors 37 and 45 may be so constructed that the indicating hand 28 may be any desired number of times as sensitive as the indicating hand 27. In the example shown in the drawings, the sensitive hand 28 is three times as sensitive as the regular hand 27.

The rotating dial 54 is provided with a number of scales having graduations in order to enable a direct reading of the weight on the formation in pounds, tons, or any other desired unit. In the example shown in the drawings the scales are calibrated in pounds. In practically every instance in actual practice there are either 4, 6, 8, 10, or 12 cable lines between the crown block and the traveling block, and scales are provided for each of said instances.

In order to determine the amount of weight suspended from the derrick, the drill string 17 is raised so that the bit 18 does not rest on the bottom of the well hole. The amount of said weight is indicated on the small stationary dial 52.

In order to obtain a direct reading of the weight on the formation in pounds, the larger dial 54 is rotated to a position so that the zero on the scale for the number of cable lines corresponding with the actual number of cable lines between the crown block and the traveling block used on the particular drilling rig on which the unit is installed, is in line with the reading on the small dial 52 for the total amount of weight suspended from the derrick. For example, if the well drilling rig has ten cable lines between the crown blocks 11 and the traveling block 14, the outer dial 54 is rotated by turning the knob 58 so that the zero mark on the 10 cable line scale corresponds with the reading of the indicating hand 27 on the small dial 52 for the total amount of weight suspended from the derrick.

As drilling operations are resumed, the amount of weight on the formation will be indicated on the rotatable dial 54 directly in pounds by the indicating hand 27, and the amount of weight suspended from the derrick will be indicated by said indicating hand 27 on the small dial 52.

Obviously it is necessary to determine the total amount of weight suspended from the derrick, and to change the position of the zero on the proper scale, so that the zero mark on said scale corresponds with the total weight indicated on the dial 52 every time a change is made in the drill string.

Although I prefer to provide a rotatable dial having several scales on it, it is evident that a plurality of rotatable dials may be used, each of said dials having one or more scales, and the dial having the scale corresponding to the number of cable lines between the crown block and the traveling block on the particular rig on which the installation is made, mounted in the gauge around the inner dial 52.

From the foregoing description, taken in connection with the accompanying drawings, the uses, advantages, and operation of my invention will be readily understood by those skilled in the art to which the invention appertains.

While I have described the principle of operation together with the form of my invention which I now consider to be the best embodiment thereof, I desire to have it understood that the articles shown and described are merely illustrative and that the invention is not to be limited to the details disclosed herein, but is to be accorded the full scope of the appended claims.

I claim:

1. A gauge for indicating the amount of weight on the formation in drilling operations comprising a stationary dial adapted to indicate the amount of weight suspended from the derrick, a rotatable member adjacent said stationary dial and rotatable with respect thereto, said rotatable member having a plurality of scales thereon for directly indicating the amount of weight on the formation in pounds, said scales corresponding to the number of cable lines used between the crown block and the traveling block, a pointer to cooperate with the stationary dial to indicate the amount of weight suspended from the derrick and to cooperate with the scale corresponding to the number of cable lines used between the crown block and the traveling block to indicate the amount of weight on the formation, and means for rotating the rotatable member.

2. A gauge for indicating the amount of weight on the formation in drilling operations comprising a stationary dial adapted to indicate the amount of weight suspended from the derrick, a member adjacent said stationary dial and rotatable with respect to said dial, said rotatable member having a plurality of scales corresponding with usual mechanical advantages of drilling systems, the markings of said scales running in reverse direction to the markings on said stationary dial, said rotatable member being adapted to be rotated with respect to said stationary dial so that the zero mark on the scale corresponding with the mechanical advantage of the drilling system in a given installation is in line with the indication on said statonary dial for the total amount of weight suspended from the derrick so that the amount of weight on the formation may be read directly on said last-mentioned scale of said rotatable member, a pointer to cooperate with the stationary dial to indicate the amount of weight suspended from the derrick and to cooperate with the last mentioned scale of said rotatable member to indicate the amount of weight on the formation, and means for rotating said rotatable member.

HAROLD A. RAPHAEL.